(12) United States Patent
Wójtowicz et al.

(10) Patent No.: US 9,073,039 B2
(45) Date of Patent: Jul. 7, 2015

(54) CARBON SORBENT FOR REVERSIBLE AMMONIA SORPTION

(71) Applicants: Marek A. Wójtowicz, East Hartford, CT (US); Joseph E. Cosgrove, Columbia, CT (US); Michael A. Serio, Sturbridge, MA (US)

(72) Inventors: Marek A. Wójtowicz, East Hartford, CT (US); Joseph E. Cosgrove, Columbia, CT (US); Michael A. Serio, Sturbridge, MA (US)

(73) Assignee: ADAVANCED FUEL RESEARCH, INC., East Hartford, CT (US)

( * ) Notice: Subject to any disclaimer, the term of this patent is extended or adjusted under 35 U.S.C. 154(b) by 178 days.

(21) Appl. No.: 13/987,229

(22) Filed: Jul. 12, 2013

(65) Prior Publication Data
US 2014/0013942 A1      Jan. 16, 2014

Related U.S. Application Data

(60) Provisional application No. 61/741,164, filed on Jul. 13, 2012.

(51) Int. Cl.
*B01J 20/20* (2006.01)
*B01J 20/30* (2006.01)
*B01D 53/02* (2006.01)
*B01J 20/34* (2006.01)

(52) U.S. Cl.
CPC .............. *B01J 20/20* (2013.01); *B01J 20/3085* (2013.01); *B01D 53/02* (2013.01); *B01J 20/3416* (2013.01); *B01J 20/3491* (2013.01); *B01D 2253/102* (2013.01); *B01D 2257/406* (2013.01); *B01D 2259/4575* (2013.01)

(58) Field of Classification Search
CPC .... B01D 53/02; B01D 53/04; B01D 53/0476; B01D 2253/102; B01D 2257/406; B01D 2259/4575; B01J 20/20; B01J 20/3416; B01J 20/3491; B01J 20/3078; B01J 20/3085; B01J 20/3202
USPC .......... 95/90, 95, 128, 159, 901, 903; 96/153; 423/237, 239.1, 352; 502/418, 432, 502/433, 439
See application file for complete search history.

(56) References Cited

U.S. PATENT DOCUMENTS

| | | | |
|---|---|---|---|
| 5,807,424 A * | 9/1998 | de Ruiter et al. | 95/148 |
| 6,261,345 B1 * | 7/2001 | Miyano et al. | 95/96 |
| 6,863,713 B1 * | 3/2005 | Ghosal et al. | 95/117 |
| 2002/0025290 A1 * | 2/2002 | Chang | 423/418 |

* cited by examiner

*Primary Examiner* — Frank Lawrence
(74) *Attorney, Agent, or Firm* — Ira S. Dorman

(57) ABSTRACT

A sorbent that is particularly effective for the efficient adsorption and subsequent desorption of ammonia is produced from a high-purity carbon material which is exposed to an oxidizing environment so as to produce an effective amount of at least one oxygen species on its exposed surfaces. The high purity carbon material may be produced by carbonizing a polymer material, and the sorbent may comprise a support having an open-cell, three dimensional, lattice-like structure.

34 Claims, 12 Drawing Sheets

CARBON SORBENT FOR REVERSIBLE AMMONIA SORPTION

CROSS-REFERENCE TO RELATED APPLICATIONS

This application claims the benefit of U.S. provisional application No. 61/741,164, bearing the foregoing title and filed on Jul. 13, 2012, the entire specification of which is incorporated hereinto by reference thereto.

STATEMENT REGARDING FEDERALLY SPONSORED RESEARCH OR DEVELOPMENT

The United States Government has rights in this invention under the following contract: National Aeronautics and Space Administration contract No. NNX11CG26P.

BACKGROUND OF THE INVENTION

The NASA objective of expanding the human experience into the far reaches of space requires the development of regenerable life support systems. This invention concerns the development of regenerable carbon sorbents for trace-contaminant (TC) removal for the space suit used in Extravehicular Activities (EVAs), and also for cabin air revitalization system. The main trace contaminant of concern is ammonia, the concentration of which should not exceed about 20 ppm. It will be appreciated by those skilled in the art that the sorbents described in this disclosure may be used in other applications where ammonia needs to be removed from a gas environment using a sorbent that can be regenerated by exposure to vacuum or a flow of purge gas.

Currently, a bed of granular activated carbon is used for TC control. The carbon is impregnated with phosphoric acid to enhance ammonia sorption, but this also makes regeneration difficult, if not impossible. Temperatures as high as 200° C. have been shown to be required for only partial desorption of ammonia on time scales of 18-140 hours (Paul, H. L. and Jennings, M. A., "Results of the trace contaminant control trade study for space suit life support development," Proc. 39th Int. Conf. on Environmental Systems (ICES), Savannah, Ga., Jul. 12-16, 2009, SAE technical paper No. 2009-01-2370, SAE International, 2009). Neither these elevated temperatures nor the long time needed for sorbent regeneration is acceptable. Thus, the activated carbon has been treated as an expendable resource and the sorbent bed has been oversized in order to last throughout the entire mission [23 kg carbon for cabin-air revitalization and about 1 lb (0.454 kg) for the space suit]. Another important consideration is pressure drop. Granular sorbent offers significant resistance to gas flow, which is associated with a high demand for fan power. Thus, there is a great need for an effective TC sorbent that could be regenerated by short exposure to vacuum at low temperatures (under 80° C. for less than 1 hour). A monolithic structure (e.g., a honeycomb) is also desired to reduce fan-power consumption.

The current state of the art and historical approaches to trace-contaminant removal in the primary life support system (PLSS), often referred to as the space suit backpack, were recently reviewed (Paul and Jennings, supra). Activated carbon (charcoal) was identified as a clear winner for the trace contaminant control system (TCCS) application in terms of effectiveness, simplicity, and maturity of this technological solution. Carbon regeneration, however, has always been problematic, mainly because all carbons used to date were impregnated with phosphoric acid or other acidic compounds. This results in a virtually irreversible chemical reaction with ammonia and salt formation, which greatly complicates regeneration. It has been widely believed that unimpregnated carbon does not adsorb ammonia (see, for example, http://en.wikipedia.org/wiki/Activated_carbon; Luna, B., Podolske, J., Ehresmann, D., Howard, J., Salas, L. J., Mulloth, L., and Perry, J. L., "Evaluation of commercial off-the-shelf ammonia sorbents and carbon monoxide oxidation catalysts," Proc. 38th Int. Conf. on Environmental Systems (ICES), San Francisco, Calif., Jun. 29-Jul. 2, 2008, SAE technical paper No. 2008-01-2097, SAE International, 2008; and Luna, B., Somi, G., Winchester, J. P., Grose, J., Mulloth, L., and Perry, J., Evaluation of commercial off-the-shelf sorbents and catalysts for control of ammonia and carbon monoxide," Proc. 40th Int. Conf. on Environmental Systems (ICES), Barcelona, Spain, Jul. 11-15, 2010, AIAA technical paper No. 2010-6062, AIAA, 2010), and that chemisorption is the only option to bind ammonia to the carbon surface. It is believed that this is true only for carbons with a fairly wide distribution of pore sizes, i.e. for almost all commercial carbons. If the pore size could be optimized, however, in such a way so that almost all pores have the right size for ammonia physisorption, it is believed that no chemical impregnation is necessary to effect ammonia sorption. Furthermore, physisorbed ammonia is relatively easy to desorb using vacuum regeneration as no chemical bonds have to be broken. It is not known if any systematic studies are available that address the effect of carbon pore structure on the regeneration performance of ammonia sorbents.

It is believed that a non-optimal sorbent structure, both internal (pore-size distribution) and external (intraparticle heat transfer limitations), combined with chemical impregnation, has led to extremely long sorbent regeneration time scales on the order of 5-140 hours depending on temperature in the range 130-200° C. (Paul and Jennings, supra). The use of monolithic carbon structures for reversible ammonia sorption/desorption, as a function of temperature, pressure (vacuum), humidity, and carbon pre-treatment, is disclosed in the present specification. It will be appreciated by those skilled in the art that although the monolithic structure, e.g., a foam, is convenient from the standpoint of pressure drop, the application of this invention is by no means limited to monolithic carbon. In particular, granular carbon can be used as well. The main focus of the invention is vacuum-regenerable sorbents, but rapid resistive heating to moderately low temperatures (up to 80° C.) can also be considered as an optional feature to accelerate the vacuum regeneration process.

It is believed that good ammonia-sorption capacity can be accomplished through the combination of a particularly favorable pore structure for optimum physical adsorption (physisorption) of ammonia and carbon-surface conditioning that enhances adsorption without adversely affecting vacuum regeneration. The avoidance of acid impregnation of carbon further helps the cause of adsorption reversibility. Finally, the issues of pressure drop and fan-power requirement are addressed through the use of a monolithic sorbent structure.

BRIEF SUMMARY OF THE INVENTION

The broad objects of the present invention are to provide novel sorbents, particularly sorbents that efficiently adsorb and desorb ammonia, and to provide a novel and highly effective method for the removal of ammonia from gaseous environments.

It has now been found that certain of the foregoing and related objects of the invention are achieved by the provision of a method for the removal of ammonia from a gaseous, ammonia-containing environment, comprising the steps: providing a porous, carbonaceous sorbent that is capable of ammonia sorption and desorption; causing a volume of gas from a gaseous, ammonia-containing environment to pass through the sorbent, to thereby effect sorption of ammonia from the gas volume; and exposing the sorbent to a vacuum environment, advantageously at ambient temperature, to thereby effect desorption and removal of a substantial portion of the adsorbed ammonia therefrom. The sorbent employed is produced by carbonizing a polymer material so as to provide a high-purity carbon material, which is exposed to an oxidizing environment under conditions sufficient to produce an effective amount of at least one oxygen species on exposed surfaces, such that the sorbent contains normally at least 0.10, and preferably at least 0.25, and most desirably at least 0.5, weight percent of the oxygen species.

The oxygen species may be produced by exposing the sorbent to air, oxygen, ozone, hydrogen peroxide, nitric acid, or mixtures thereof, or to another suitable oxidizing environment. In many instances, the oxidizing environment will most desirably comprise air at a temperature in the range 150° C. to 400° C., with an exposure time of at least 5 minutes; preferably, the temperature range will be 250° C. to 325° C. and the exposure time will be 24 to 72 hours. When the oxidizing environment is other than air the temperature and exposure time will be varied so as to produce equivalent levels of surface oxidation. In any event, the carbon of which the carbonaceous sorbent consists will normally be substantially free from mineral contaminants in elemental or molecular state.

The polymer material used in the method will desirably be selected from the group consisting of polyvinylidene chloride homopolymer or copolymer, polyfurfuryl alcohol, phenolic resin, and mixtures thereof, and most desirably it will comprises at least 70 weight percent of polyvinylidene chloride. In preferred embodiments, the pores of the sorbent will not substantially exceed 20 angstroms in size.

The sorbent utilized in the ammonia-removal method may advantageously be produced with the additional steps of: providing a support having an open-cell, three-dimensional, lattice-like structure with large-scale porosity of not more than 500 pores per linear inch; providing a liquid polymer solution or a polymer material in powder form; infusing the support with either the polymer solution or the polymer material powder; and heat-treating the infused support so as to carbonize the polymer of the solution or of the polymer material powder, as the case may be, so to produce the high-purity carbon material therefrom. In such embodiments, the porosity of the support will normally be in the range of 5 to 300 pores per inch, and preferably will not exceed 100 pores per inch. The support material will generally be selected from the class consisting of reticulated vitreous carbon foam, reticulated metal, and reticulated silicon carbide.

Other objects of the invention are attained by the provision of a method for the production of a sorbent, and by the provision of a sorbent so produced, comprising the steps:

carbonizing a polymer material so as to produce a high-purity carbon material; and exposing the high-purity carbon material to an oxidizing environment under conditions sufficient to produce at least one oxygen species on exposed surfaces, the sorbent containing at least 0.10, and preferably at least about 0.25, weight percent of the oxygen species. The nature of the polymer material used, the oxidizing conditions employed, and the characteristics of the sorbent may be as hereinabove and hereinafter described.

An alternative method for the production of a sorbent embodying the invention comprises the steps: providing a support having an open-cell, three-dimensional, lattice-like structure with large-scale porosity wherein there are not more than 500 pores per linear inch; providing a liquid polymer solution or a polymer material in powder form; infusing the support with either the polymer solution or the polymer material powder; and heat-treating the infused support so as to carbonize the polymer of the solution, or of the polymer material powder, so to produce a high-purity carbon material therefrom.

Heat-treating of the infused support will normally be effected in an inert or reducing atmosphere, in vacuum, or under a purge gas, and at a temperature in the range of 300° C. to 1,500° C. The pores of the resultant sorbent should not substantially exceed 20 angstroms in size, and the large-scale porosity will normally provide 5 to 300, and preferably not more than 100, pores per inch. In many instances it will be desirable for the exposed surfaces of the sorbent carry thereon at least one oxygen species, produced as hereinabove and hereinafter described.

In those instances in which a liquid polymer solution is employed, the foregoing method includes at least one cycle of dipping the support into the liquid polymer solution, to effect infusion, followed by draining and drying of the support prior to the heat-treating step. The method may desirably include at least a second cycle of infusion, draining, and drying, and a heat-treating step (which may be full or partial, to achieve full or partial carbonization) may intervene between two (or more) cycles, as well as a full carbonization heat treating step being carried out after the last of a plurality of cycles. Suitable liquid polymer solutions may be prepared by dissolving a polymer material selected from the group consisting of polyvinylidene chloride homopolymer or copolymer (comprising at least 70 weigh percent of polyvinylidene chloride), polyfurfuryl alcohol, phenolic resin, and mixtures thereof, in a solvent selected from the class consisting of acetone, methyl ethyl ketone, N-methylpyrrolidone, and mixtures thereof. The method may desirably include an additional step of curing of the infused support in water at a temperature in the range of 30° C. to 1,500° C.

DETAILED DESCRIPTION OF THE INVENTION

Vitreous Carbon Foam Monoliths

A novel methodology was developed for making PVDC-based carbon that has the structure provided by the skeleton made from vitreous carbon foam. A low-density support structure was coated with a PVDC precursor and carbonized to form a porous sorbent-coated monolith. The objective was to produce predominantly microporous monolithic carbon (from PVDC) that had good mechanical properties and an open-cell structure (from vitreous carbon foam). These structures were expected to show good ammonia adsorption and desorption performance as well as low pressure drop.

The support structure that we employed was a Duocel® foam manufactured by ERG Aerospace Corporation. This foam is described as an open-cell, porous structure consisting of an interconnected network of solid "struts." It is available in a variety of pore sizes, defined as pores per inch (ppi), in the range of 5-100 ppi. Materials include aluminum, copper, reticulated vitreous carbon (RVC) and silicon carbide (SiC), and blocks of these materials can be obtained with volumes as high as 37 liters (carbon and silicon carbide). For the space-suit application, vitreous carbon was chosen as the sorbent support structure. Unlike the metal foam materials, vitreous carbon is chemically resistant to the hydrogen-chloride vapors that are evolved during carbonization of PVDC. Compared to silicon carbide, the carbon foam is more readily available, has a lower cost, and is lighter for a given porosity. The 30-80 ppi foam that was used is available as 4×4 inch (10×10 cm) panels in nominal thicknesses up to 0.5 inch (1.3 cm). It was found that it could be easily and reproducibly cut into cylinders using a precision arch punch.

Two fabrication routes for producing the PVDC carbon-coated foam structures were explored. A wet-deposition technique, in which the RVC foam substrates were dip-coated in a PVDC solution precursor and then carbonized, was initially investigated. In the second approach, the foam substrates were filled with the dry PVDC powder and then carbonized. Three PVDC precursor powders were evaluated: a PVDC homopolymer from Honeywell, a Dow Chemical copolymer (Saran 506), and a Solvay Advanced Polymers copolymer (IXAN SGA-1). The main processing parameters affecting ammonia adsorption performance are the starting material (type of polymer), the carbonization temperature, and activation conditions, if activation is employed. The effect of a carbon surface conditioning step, using thermal oxidation in air, turned out unexpectedly to be of paramount importance for good ammonia-sorption capacity and sorbent regeneration in vacuum. Experimental details for each fabrication method, surface conditioning, ammonia adsorption testing, and regeneration testing are provided below.

Polymer Solution Coating

Figure 1:
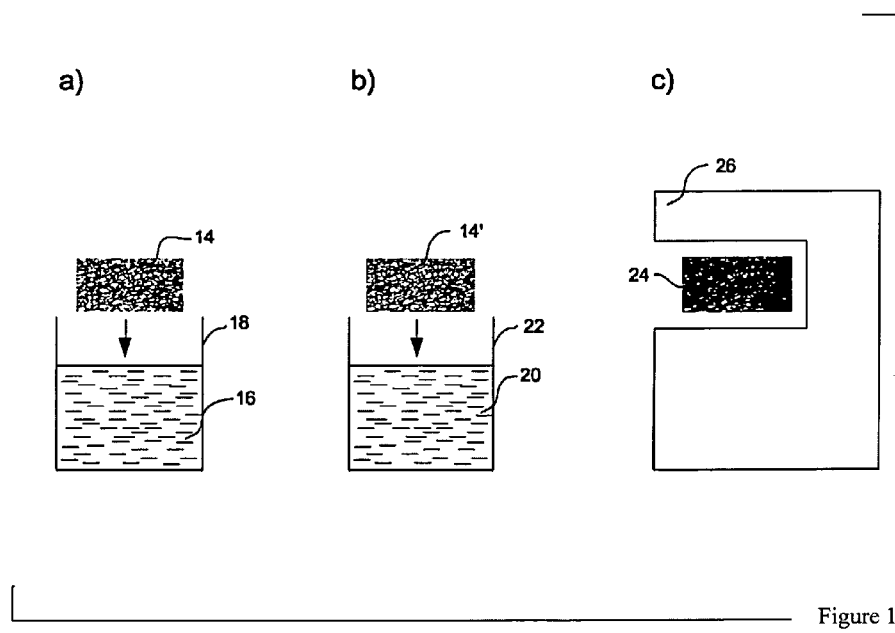
FIG. 1 is a schematic representation of the process sequence for coating vitreous carbon foam with PVDC carbon.

For dip-coating experiments, RVC foam samples with pore sizes ranging from 30-80 ppi were cut into 22 mm diameter× 12 mm thick substrates. The mass of the bare substrates ranged from 0.20-0.25 g, depending on the pore size. The process of coating the substrates using a PVDC liquid precursor involved three basic steps, as illustrated in FIG. 1. In Step 1, foam sample 14 was first dipped in a solution of PVDC/solvent 16, being contained in vessel 18, and then briefly drained (FIG. 1*a*). In Step 2 (FIG. 1*b*), sample 14', obtained from the previous step, was submerged in a bath of hot water 20, the hot water being contained in vessel 22 and having a temperature of 40-50° C., for a period of about 30 seconds, and then cured for 12-36 hours. In Step 3 (FIG. 1*c*), sample 24, obtained from the previous step, was heat-treated in tube furnace 26 at about 300° C. under flowing high purity nitrogen (1 L/min) to boil off any trapped solvent and water, and to partially carbonize the PVDC. To increase the mass of PVDC carbon in the foam, the process cycle was repeated until the desired PVDC carbon/foam mass ratio was achieved. At this point, the sample was subjected to a final high temperature heat treatment (in nitrogen) to fully carbonize the PVDC. A heating rate of about 10° C./min was used up to 750° C. and about 15° C./min from 750° C. to the final heat-treatment (carbonization) temperature, up to 1050° C. After the final high-temperature carbonization step, the mass of PVDC carbon deposited on the foam samples was found to be about 0.15-0.30 g/coat cycle, depending on the foam pore size and the PVDC solution concentration.

The PVDC precursor solutions (Step 1) were prepared by dissolving the PVDC powder in a suitable organic solvent, using vigorous stirring and modest heating to 50° C. Of the three polymer formulations studied, the Solvay blend was the most soluble. It readily dissolved in acetone, methyl ethyl ketone and N-Methylpyrrolidone (NMP). The Solvay solutions were also observed to be the most stable, having shelf lives of more than one week for NMP-based solutions prepared up to 35% in concentration (by weight). The Dow PVDC blend was only soluble in NMP at concentrations up to 30%, and its shelf life was limited to one day. The Honeywell homopolymer was much more difficult to dissolve, requiring heating to 100° C. and higher. However, upon cooling to below 50° C., the solutions gelled and were unusable for dip-coating. Consequently, dip-coating of the RVC foams was performed using only the Solvay and Dow solutions.

Figure 2:
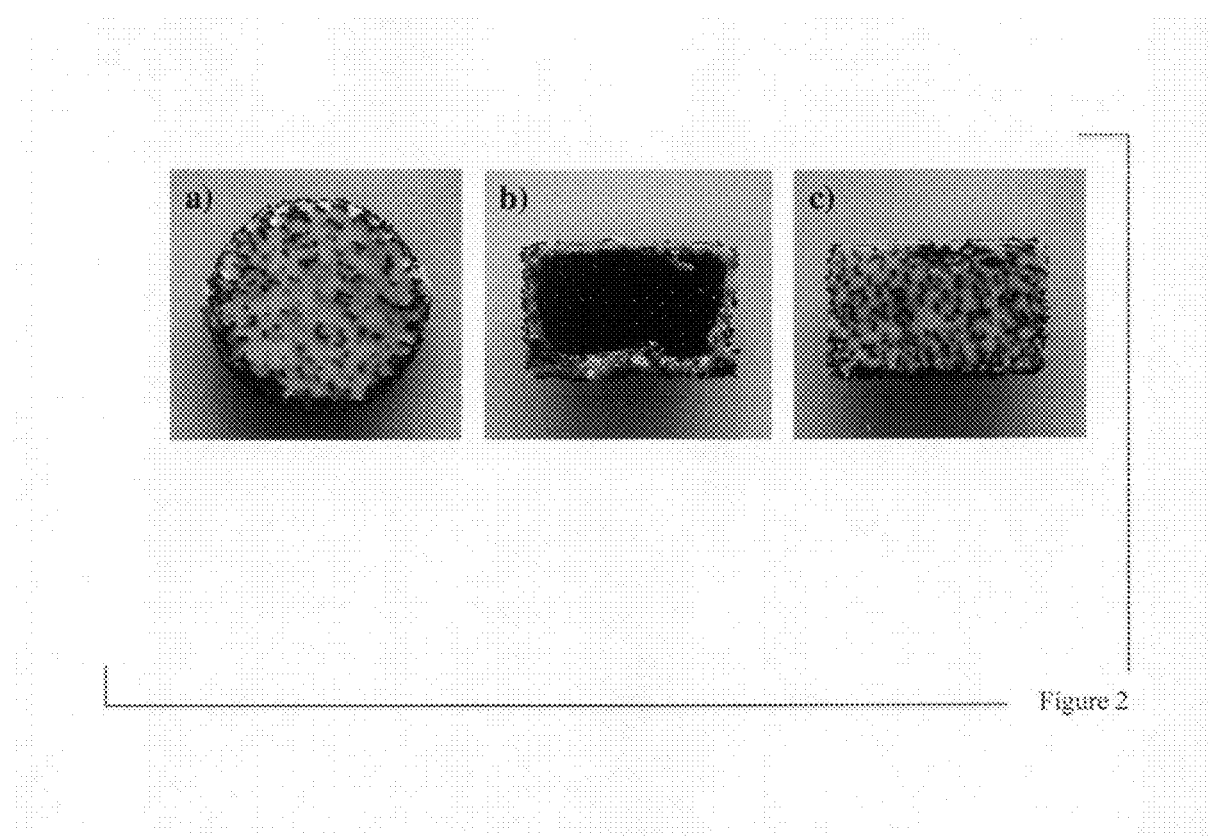
FIG. 2 consists of photographs of vitreous carbon foam coated with PVDC solution: (a) top-view (base) of a 30 ppi foam sample (22 mm in diameter) after a 30-second dip step in hot water; (b) cross-sectional view of a 30 ppi foam sample immediately after a 30-second dip in hot water; (c) cross-sectional view of a 30 ppi foam sample after a 30-second dip in hot water followed by an about 16-hour curing period in air; three different samples are shown.

The water-submersion step (Step 2) partially crystallizes or "sets" the PVDC, forming a continuous external skin of polymer on the foam substrate, as shown in FIG. 2a. (It cannot be ruled out that some type of reaction with the water is occurring, but it is more likely that the water simply displaces the solvent, causing the PVDC to locally re-crystallize.) The outer skin seems to encapsulate the PVDC solution inside the foam matrix (FIG. 2b), minimizing further drainage of the PVDC solution. After an additional curing period (>12 hours) in air, a substantial amount of the PVDC inside the foam matrix is crystallized, as shown in FIG. 2c. Note, however, that although in FIG. 2c the foam/polymer structure appears completely solidified, there is still a significant amount of liquid that remains, including the solvent and possibly trapped water.

Figure 3:
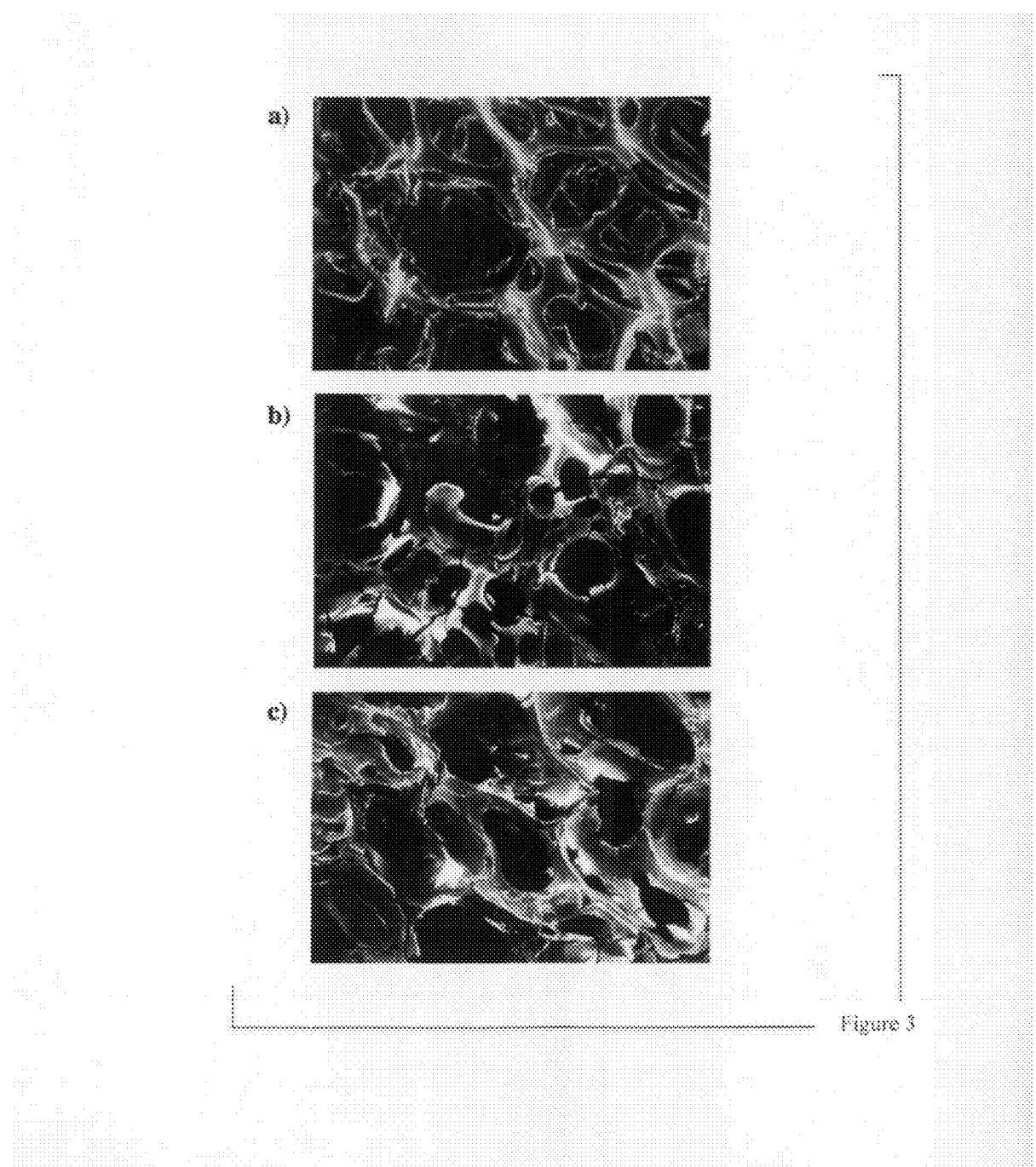
FIG. 3 consists of SEM images of: (a) an uncoated 30 pores per inch (ppi) carbon foam cylinder; (b) the top surface of a 30 ppi foam cylinder after 5 coat cycles (net weight gain of 0.756 g) using a 19 wt % solution precursor; and (c) the middle region of the same coated cylinder sample.

An important goal of the solution-coating method is that the coated sorbent has good adhesion to the carbon support structure. FIG. 3 compares scanning electron microscopy (SEM) images obtained for an uncoated carbon foam disc and two different regions of a carbon foam disc after 5-coat cycles. For the uncoated sample (FIG. 3a), the lattice nature of the foam is clearly evident in the image as several levels of the carbon framework can be seen. FIG. 3b displays an image obtained from the external surface (base) of the coated disk. After five coating cycles, the carbon struts appear thicker and obviously coated, yet the underlying lattice is still evident. To further probe this sample, it was sliced in half (perpendicular to the cylinder axis) for SEM analysis of the inner coated region. As shown in FIG. 3c, the carbon lattice is still evident but appears heavily coated, similar to the external surface of the sample.

Dry Powder Coating

The second PVDC carbon coating method that was studied used dry PVDC powder precursors. For these experiments, the substrates were cut from 80 ppi RVC foam into 22 mm diameter×12 mm thick substrates. They were then placed into a sealed plastic container, partially filled with PVDC powder (Honeywell or Dow), and then gently shaken for a few minutes. The powder-filled foam samples were then carbonized (in nitrogen), again in two separate heat treatments. Here, however, a ramp rate of 1° C./min was employed for the low temperature carbonization step to 300° C. to avoid "foaming." For the final heat-treatment step, a heating rate of about 1° C./min was used up to 550° C. and about 5° C./min from 550° C. to the final cure temperature (800-1450° C.). In these experiments, only the Honeywell and Dow PVDC powders were studied and only one carbon deposition cycle was performed for each sample. The yield of carbon for each sample was 0.5-0.6 g per run, which was much higher than the carbon yield per cycle for the dip-coated samples.

Carbon-Dioxide Activation

High-temperature activation of both dip-coated and dry-coated foam samples was performed in pure carbon dioxide, using a high-temperature tube furnace. The samples were heated to 900° C. at a ramp rate of about 22° C./min and held for 4 hours, yielding a burn-off (weight loss) of about 25%. We also observed similar burn-off in the RVC foam substrate and, therefore, always included a bare foam sample during each activation run, to correct for any foam losses in the PVDC carbon coated samples.

Thermal Oxidation

As described below, surface conditioning of the PVDC carbon after carbonization, via thermal oxidation at relatively modest temperatures, had a dramatic effect on ammonia adsorption. For these experiments, the PVDC carbon-coated foam samples were oxidized in ambient air at temperatures ranging from 250° C. to 325° C. for periods of up to 72 hours. At 250° C., none of the samples that were studied showed any weight loss after oxidation. At 325° C., however, a sample carbonized to 900° C. showed about 20% burn-off, while a sample carbonized to 1450° C. showed no measurable weight loss.

Granular Activated Carbon

Three types of commercially available granular activated carbons were obtained from the leading activated-carbon manufacturers: Calgon and Norit. Ammonasorb II (impregnated with phosphoric acid), and BPL (no acid impregnation or acid washing) were provided by Calgon. Norit provided DARCO, which is produced from lignite coal by steam activation, followed by acid wash. All the above activated carbons were ground to −30+40 mesh size prior to ammonia-sorption testing.

Carbon Characterization

A fully automated gas-sorption system Quantachrome ASiQwin was used for collecting and processing nitrogen-isotherm data. Several carbon samples were tested, and all of them were outgassed under vacuum at 300° C. for at least 3 hours prior to measurements. Nitrogen adsorption isotherms were then determined at 77 K, and these data were used to perform the following analyses: (a) BET surface area; (b) pore volume; (c) Dubinin-Radushkevich (D-R) micropore surface area and micropore volume; and (d) pore-size distribution of micropores using the Density Functional Theory (DFT).

The BET surface area of carbon/foam monoliths was found to be in the range 265-603 $m^2/g$, which was lower than expected. PVDC carbon is known to be extremely microporous, with a BET surface area close to 1000 $m^2/g$ upon carbonization (Walker, P. L., Jr., Austin, L. G., and Nandi, S. P., "Activated Diffusion of Gases in Molecular-Sieve Materials," in *Chemistry and Physics of Carbon*, P. L. Walker, Jr. (Ed.), vol 2, Marcel Dekker, New York, 1966). It was later found that the vitreous carbon foam used as a support for PVDC carbon did produce some weight loss upon sorbent carbonization and activation, which indicates that this material also contributed to the overall pore volume of the monolith. This is consistent with the nitrogen adsorption isotherm data, which showed that the percentage of micropore volume in monoliths was in the range 15-84%, again lower than expected. It is still believed that the ammonia-sorption behavior determined in this study was largely dominated by the PVDC carbon in the monolith. The total pore volume was between 0.27 $cm^3/g$ and 1.06 $cm^3/g$, and the micropore volume was found to be in the range 0.10-0.23 $cm^3/g$. It is expected that increasing the degree of microporosity in future monoliths, e.g., by avoiding supports that contribute mesoporosity, will lead to improved performance.

Ammonia Sorption and Sorbent Regeneration

Figure 4:
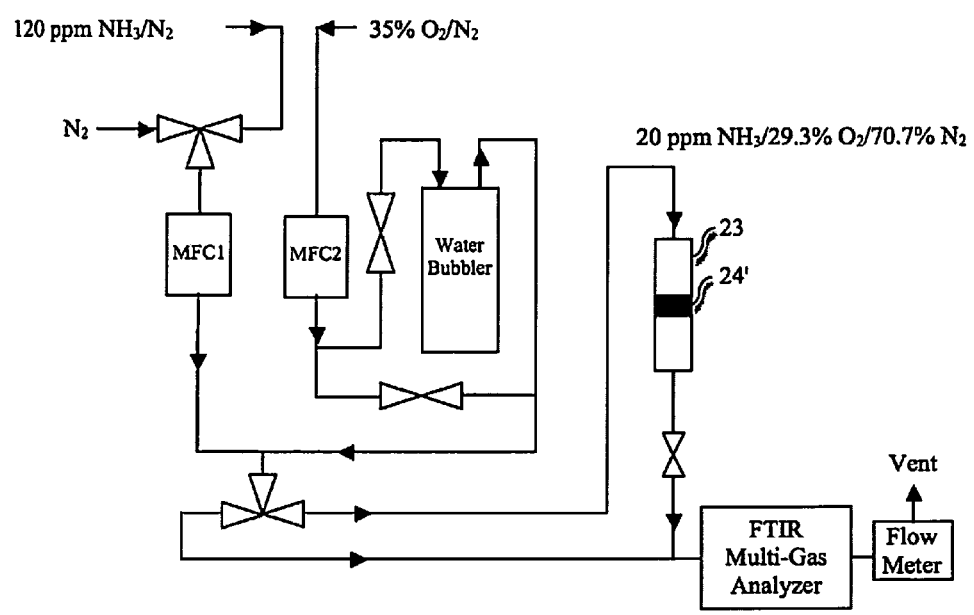
FIG. 4 is a schematic representation of the ammonia sorption/desorption test apparatus, wherein the labels "MFC1" and "MFC2" designate mass-flow controllers.

A test stand for ammonia adsorption measurements under dry and humid conditions was assembled, as shown schematically in FIG. 4. The test stand was used to evaluate the PVDC carbon monoliths as well as three granular commercial activated carbon sorbents, including Calgon's Ammonasorb II phosphoric acid-impregnated formulation. The apparatus, shown in FIG. 4, incorporates a Fourier transform infrared (FTIR) multi-gas analyzer, which was used for both ammonia and water quantification. Using mass flow controllers, a 120 ppm ammonia/nitrogen gas mixture is mixed with a 35% oxygen/nitrogen blend to achieve the desired concentration of ammonia in a balance of oxygen and nitrogen. For humidifying the gas stream, a portion of the oxygen/nitrogen mixture is re-routed through a water bubbler, using fine needle valves for adjustment. During testing, the final mixture is first routed through a sample bypass line, to establish the baseline ammonia and humidity conditions. The gas is then re-directed through the sample "cell" for the sorbent adsorption testing. The sample cell consists of a glass tube 23 that contains the sorbent sample 24'. It is mounted in a vertical orientation with the gas inlet at the top of the cell so that gas flow is in a downward direction.

The 22 mm diameter PVDC carbon-coated foam samples, and also multi-channel carbon monoliths, were wrapped in Teflon tape and then inserted into a 22 mm diameter quartz tube. The carbon sample height was typically 1.2 cm. The Teflon tape assures a snug and reasonably gas-tight fit between the foam sample and the quartz tubing. For the granular sorbents, about 0.25 g of sieved sample (+40-30 mesh) was loaded into 5 mm i.d. glass tubes and held in place using ceramic wool on both ends, resulting in a carbon bed length of about 15 mm. For the monolith samples, the inlet ammonia concentration and gas flow rate were 20 ppm and 1 L/min, respectively. For the granular samples, the inlet concentration and flow rate were 23 ppm and 0.45 L/min. The oxygen concentration used in all experiments was 29.3 vol %, with the balance being nitrogen. Gas-concentration data were collected using the FTIR analyzer at one minute intervals. The procedure was to monitor the ammonia breakthrough curves (ammonia concentration versus time) and to terminate the adsorption measurement when the ammonia concentration had reached 90% of the inlet concentration (after breakthrough).

Two methods of sorbent regeneration were explored: nitrogen gas desorption and vacuum desorption, with and without mild heating (~60° C.). The procedure for nitrogen desorption was to switch the sample gas flow to pure nitrogen, after the ammonia adsorption measurement was completed, and to monitor the ammonia desorption using the FTIR analyzer. For vacuum regeneration experiments, the sample cell was removed from the test stand and installed in a high vacuum chamber pumped by a turbomolecular pump (base vacuum of about $10^{-6}$ Torr). After the vacuum regeneration, the sample cell was re-installed on the test stand and the ammonia adsorption was measured again to determine the regenerated capacity.

A number of samples were fabricated and tested for ammonia adsorption and desorption. Table 1 summarizes the experimental details involved in the sample fabrication for a variety of representative samples, including the method of coating (solution vs. dry powder), the PVDC type, the maximum carbonization temperature and soak period, and the oxidation temperature and soak period (if employed). Table 1 also provides the ammonia adsorption capacity measured for each sample. In some cases, adsorption data are included where additional sample conditioning (activation and/or oxidation) was employed. In addition to the foam samples, Table 1 also includes the results for three commercial granular carbons, including Ammonasorb II

TABLE 1

Figure 6:
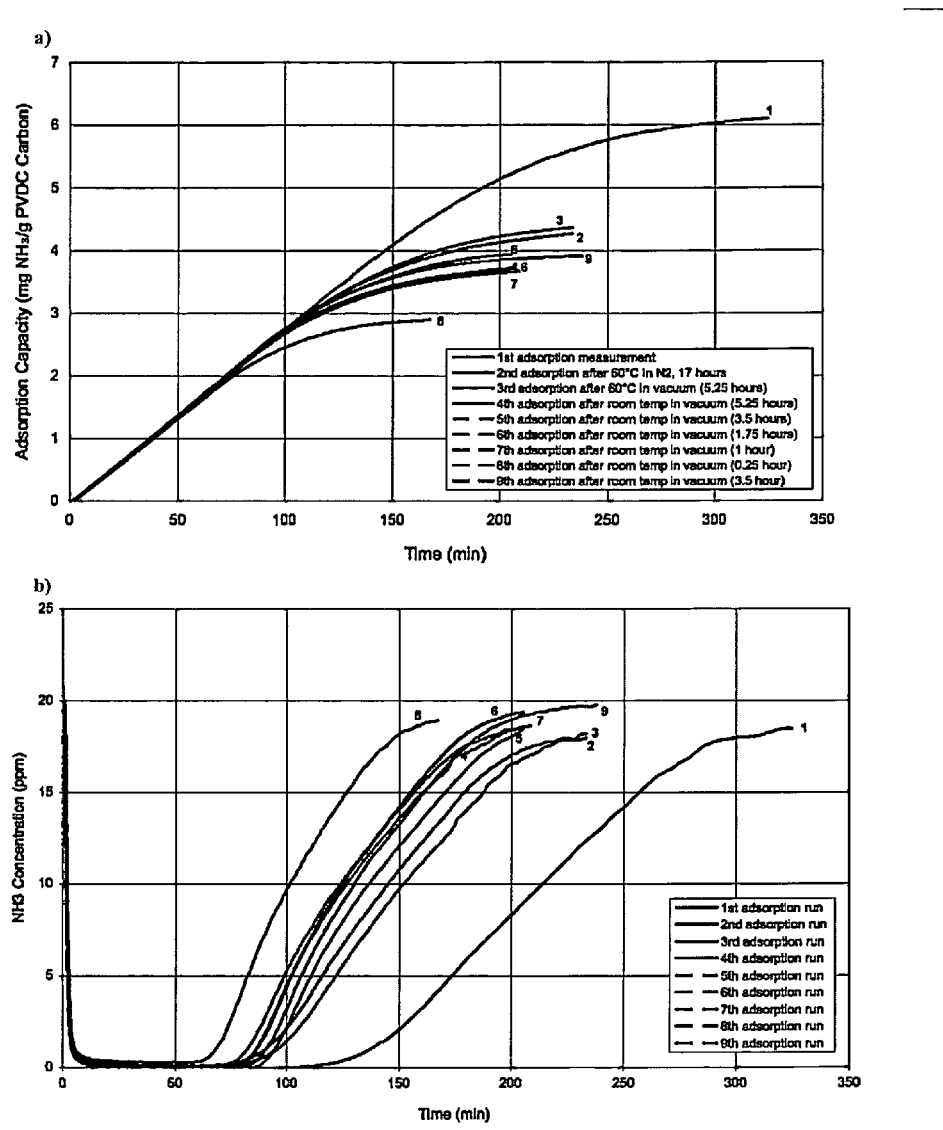
FIG. 6 consists of curves showing ammonia sorption-capacity (a) and breakthrough (b) curves for carbon monolith sample 07-26-11-de of Table 1, oxidized at 250° C. and then subjected to multiple ammonia adsorption/vacuum-regeneration cycles.
Figure 7:
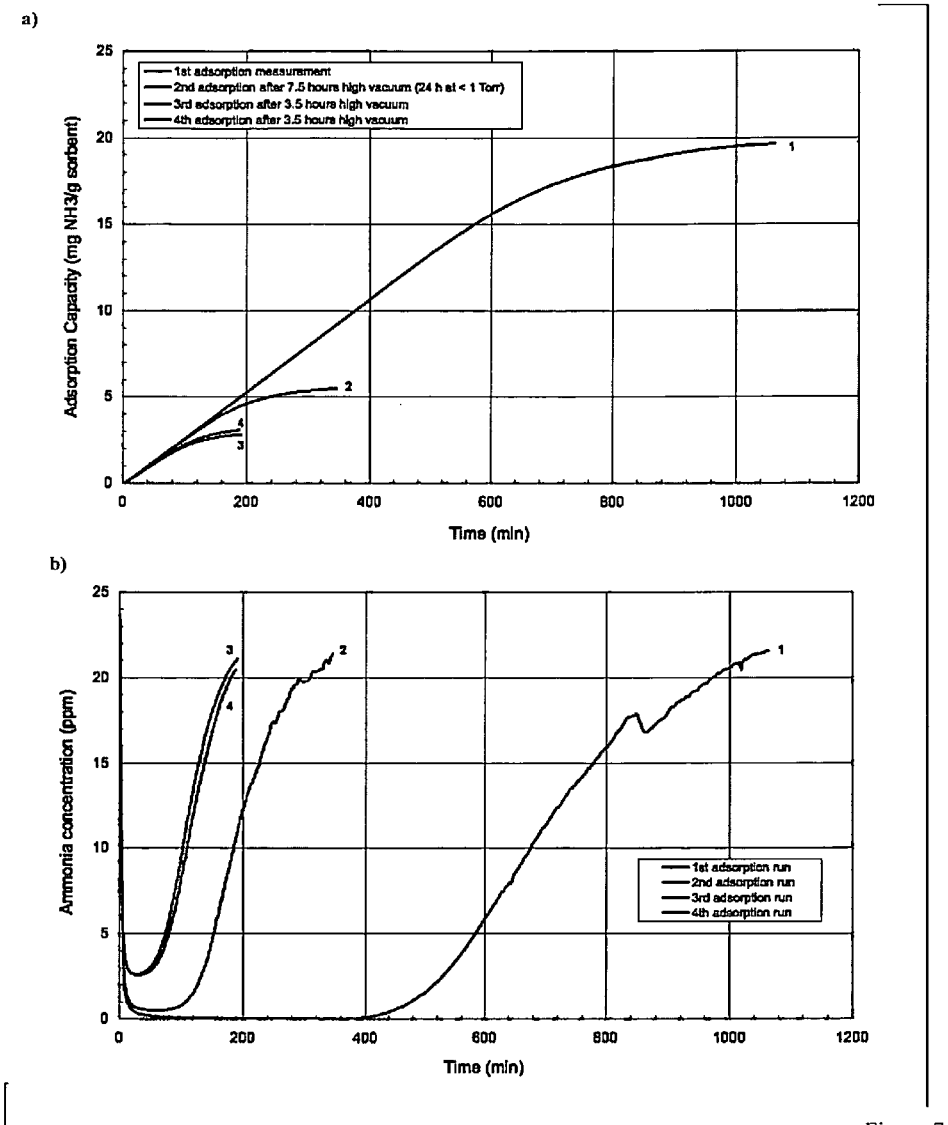
FIG. 7 consists of curves showing ammonia sorption-capacity (a) and breakthrough (b) for acid-impregnated granular carbon designated "Ammonasorb II," which was subjected to multiple ammonia adsorption/vacuum-regeneration cycles.
Figure 8:
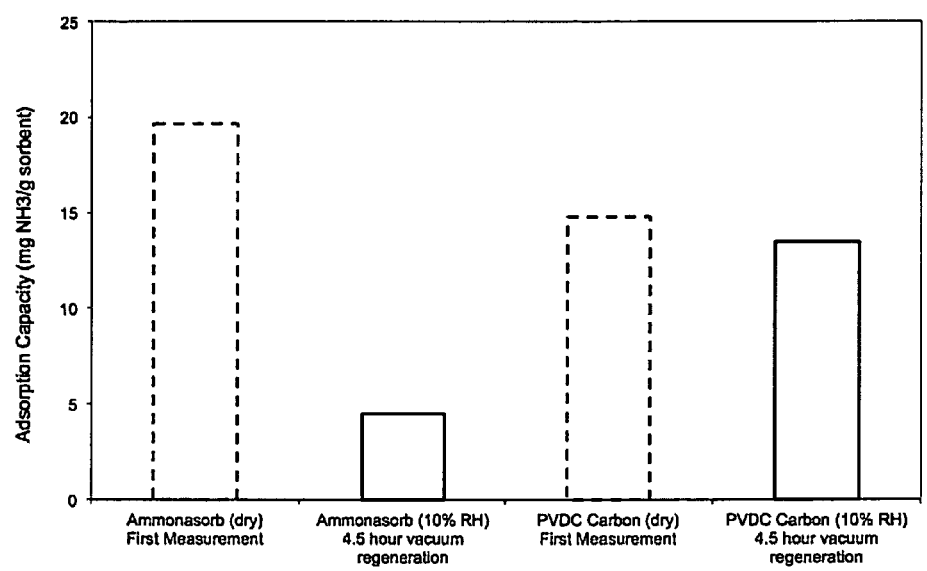
FIG. 8 is a bar chart showing the effect of vacuum regeneration on ammonia-sorption capacity for the state-of-the-art acid-impregnated activated carbon (Ammonasorb II) and one of the carbon sorbents of this invention (highly porous PVDC carbon supported on high-strength carbon foam). Data were collected at a relative humidity (RH) of 10%.

A list of selected PVDC-carbon/carbon-foam samples fabricated and tested. Test results for granular samples are also shown. Ammonia-adsorption capacity is for dry-gas conditions, and adsorption-capacity data after sorbent regeneration are shown in FIG. 6-FIG. 8.

| Sample ID | Coating Method | Precursor | Maximum Carbonization Temp., Period (° C., min) | PVDC Carbon Mass (g) | Activated PVDC Carbon Mass (g) | Oxidation Temp., Period (° C., hours) | Adsorption Capacity (mg NH$_3$/g sorbent) | | |
|---|---|---|---|---|---|---|---|---|---|
| | | | | | | | carbonized | activated | oxidized |
| 04-29-11-e | Solution | Dow | 1050, 240 | 0.632 | | | 0.093 | | |
| 05-03-11-r | Solution | Dow | 1050, 40 | 0.393 | 0.289 | | | 0.180 | |
| 05-03-11-w | Solution | Dow | 1050, 40 | 0.437 | | | 0.112 | | |
| 05-19-11-ab | Solution | Dow | 1050, 40 | 0.929 | | | 0.144 | | |
| 05-19-11-ai | Solution | Dow | 1050, 40 | 0.903 | 0.621 | | | 0.143 | |
| 05-19-11-am | Solution | Dow | 1050, 40 | 0.938 | | 250, 24 | | | 0.533 |
| 06-14-11-bp | Solution | Solvay | 1050, 40 | 1.023 | | | 0.010 | | |
| 06-17-11-bq | Solution | Solvay | 300, 75 | | | | 0.105 | | |
| 06-17-11-br | Solution | Solvay | 1050, 40 | 1.025 | | | 0.004 | | |
| 06-17-11-bt | Solution | Solvay | 700, 240 | 1.069 | | | 0.053 | | |
| 06-26-11-cc | Solution | Solvay | 1050, 40 | 1.299 | 0.852 | | | 0.082 | |
| 06-26-11-ce | Solution | Solvay | 1050, 40 | 1.046 | 0.774 | | 0.018 | 0.083 | |
| 07-26-11-de | Dry Powder | Honeywell | 900, 3 | 0.506 | | 250, 24 | 0.669 | | 6.107 |
| 08-08-11-di | Dry Powder | Honeywell | 900, 3 | 0.519 | | 250, 72 | 0.023 | | 7.225 |
| 08-08-11-dj | Dry Powder | Dow | 900, 3 | 0.412 | | 250, 24 | 0.097 | | 3.840 |
| 08-15-11-dl | Dry Powder | Honeywell | 900, 3 | 0.59 | 0.607 | 250, 24 | | 0.259 | 1.415 |
| 08-16-11-dm | Dry Powder | Honeywell | 1450, 90 | 0.549 | | 250, 24 | 0.027 | | 0.098 |
| 08-16-11-dm | Dry Powder | Honeywell | 1450, 90 | 0.549 | | 325, 3 | | | 0.228 |
| 08-23-11-dr | Dry Powder | Honeywell | 900, 3 | 0.634 | | 250, 48 | | | 7.022 |
| 09-09-11-ds | Dry Powder | Honeywell | 800, 3 | 0.611 | | 250, 24 | | | 6.465 |
| 09-19-11-dv | Dry Powder | Honeywell | 900, 3 | 0.489 | | 325, 24 | | | 14.780 |
| Norit DARCO | | | | 1.000 | | | 1.959 | | |
| Calgon BPL | | | | 0.252 | | | 0.321 | | |
| Ammonasorb II | | | | 0.257 | | | 19.650 | | |

It should be noted that, unless stated otherwise, data in Table 1, and also in the Figures, are for initial sorption (i.e. fresh carbon surface), for nominally dry-gas conditions, and for unoxidized samples. Several foam-supported carbon samples, as well as the granular Ammonasorb II, were subjected to multiple adsorption-desorption cycles, and ammonia-sorption testing was performed after each regeneration (desorption) experiment. In selected cases, both dry and humid gas conditions were used. These results are discussed in sections "Sorbent Regeneration" and "The Effect of Gas Humidity" below.

Figure 5:
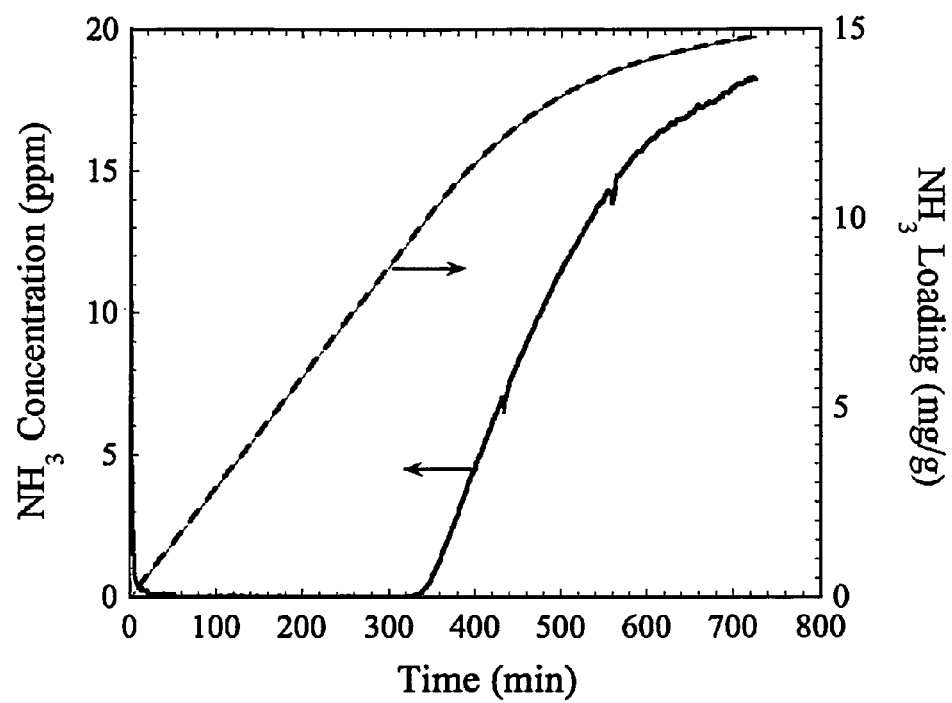
FIG. 5 consists of curves showing ammonia breakthrough (left axis) and sorption-capacity (right axis) curves for carbon/foam monolith sample 09-19-11-dv of Table 1 (which follows).

In general, ammonia-sorption data can be presented in terms of either breakthrough curves or sorption-capacity curves, and these two different ways of presenting sorption data are illustrated in FIG. 5. Although the information included in each of these curves is equivalent, most ammonia-sorption data have been reported in terms of sorption-capacity curves (e.g., see Luna et al. 2008 and Luna et al. 2010, supra). In general, this convention is followed in the data presentation, although in some cases breakthrough curves are also shown to better illustrate whether or not ammonia concentration dropped to zero and for how long it stayed at the zero level.

Sorbent Regeneration

Vacuum regeneration of ammonia sorbent is a critically important feature of the sorbents of this invention. Ammonia sorption on high-purity carbons that have not been impregnated with any acids is governed mostly by physical adsorption (physisorption) rather than irreversible, or almost irreversible, chemisorption, which dominates ammonia sorption on acid-treated or mineral-matter containing carbons. For this reason, little or no loss of sorption capacity is expected in the instant sorbents following initial cycles of ammonia adsorption-desorption. In contrast, acid-treated carbons, such as Ammonasorb II, normally show little or no recovery of their original sorption capacity after the first chemisorption event.

This is observed in a series of experiments involving PVDC/foam monolith 07-26-11-de, which was subjected to repeated ammonia adsorption-desorption cycles (FIG. 6). It can be seen that the loss of sorption capacity is essentially limited to the first cycle, and that this loss is modest (about one third). This initial loss of sorbent activity may be due to the limited irreversible sorption that takes place on few strongly acidic sites that may exist even in high-purity PVDC carbons. In contrast, the loss of ammonia-sorption capacity in the case of acid-impregnated carbon Ammonasorb II is a factor of eight, which is shown in FIG. 7. It should be noted that data in FIG. 6 represent the sorbent that has been most extensively studied with respect to multiple regeneration, and not necessarily the sorbent of the invention that is most effective for all purposes. Performance data in FIG. 6 can be compared to the corresponding data for Ammonasorb II (FIG. 7), and the superior regenerative capability of the non-acid-treated sorbent is evident. It should be noted that Ammonasorb breakthrough curves do not reach the zero level after the first adsorption experiment has been performed. This provides a clear contrast between the instant vacuum-regenerable sorbent and an acid-treated one (Ammonasorb II). The comparison of Ammonasorb II performance with a different sorbent of this invention is shown in FIG. 8. Superior sorbent regeneration is evident for the instant vacuum-regenerable sorbent, and its ammonia-sorption capacity after regeneration is almost three times higher than that for Ammonasorb II. Data shown in FIG. 8 were collected at low relative humidity (RH) conditions (10%).

Another important result concerns the time needed for sufficient sorbent regeneration. Under the conditions used, and for sorbent 07-26-11-de, it was found that a room-temperature 15-minute exposure to vacuum resulted in a temporary and partial loss of ammonia-sorption capacity, i.e. incomplete desorption (compare lines 7 and 8 in FIG. 6). This could easily be reversed upon a longer exposure of the spent sorbent to vacuum (see line 9 in FIG. 6). It was also found that a one-hour exposure to vacuum at room temperature was sufficient to provide effective ammonia desorption (compare lines 7, 8, and 9 in FIG. 6). Data in FIG. 6 also show that this desorption time scale was shorter than the adsorption time scale (usually 70-90 minutes before breakthrough took place), which makes vacuum regeneration practical in a swing fashion. This is an important result proving the feasibility of vacuum regeneration of carbons that have pores with dimensions close to molecular scales (<20 Å).

The Effect of Surface Oxidation

Figure 9:
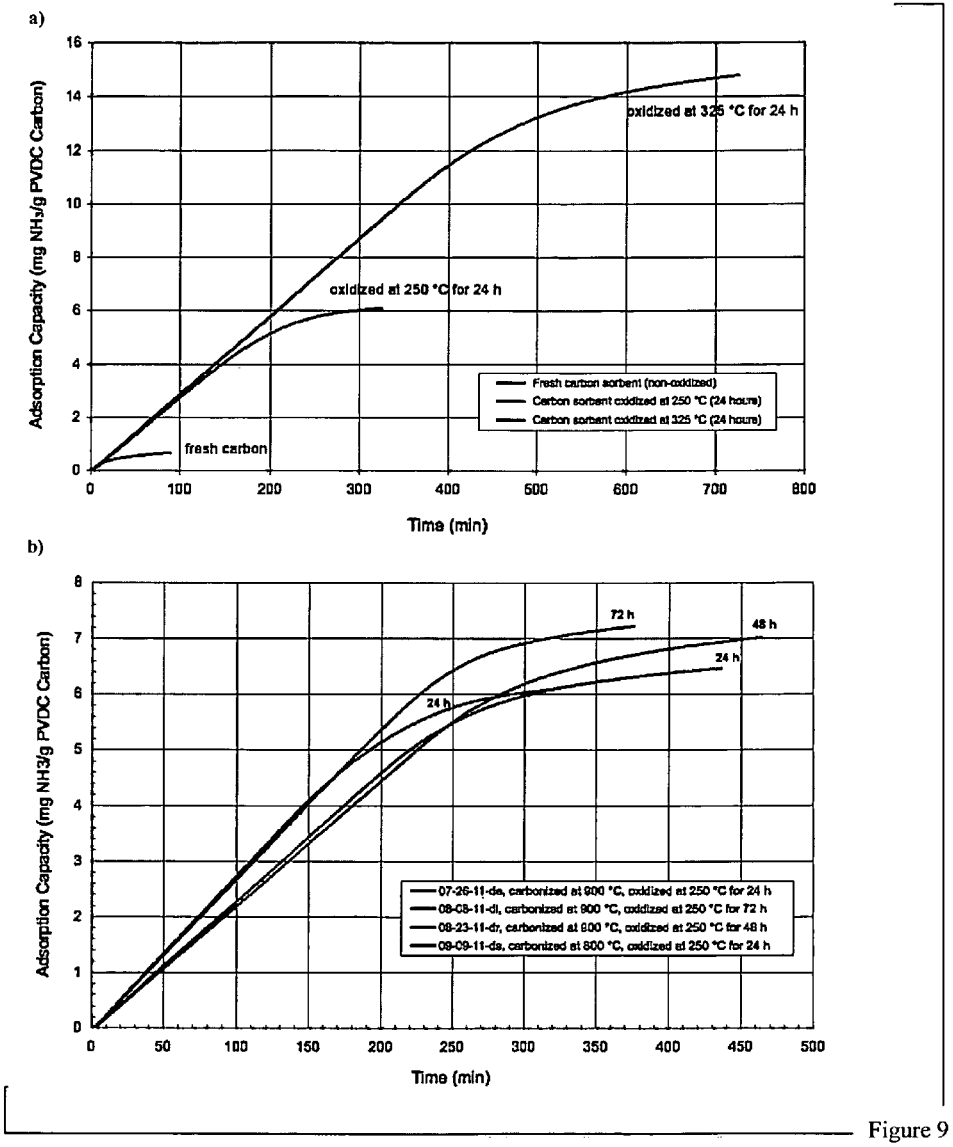
FIG. 9 consists of curves showing ammonia sorption-capacity for freshly prepared (unoxidized) carbon monoliths and those that were oxidized at various temperatures (a) and at various exposure times at 250° C. (b).

The strong effect of carbon oxidation on ammonia-sorption capacity is shown in FIG. 9. It is evident that carbon exposure to ambient air results in a tremendous increase in ammonia-sorption capacity (up to a factor of 20, depending on oxidation exposure time and temperature). Moreover, it was found that sorption enhancement due to carbon oxidation is retained upon multiple vacuum regenerations of the sorbent (see FIG. 6).

The above results can be explained by the formation of weakly acidic carbon-oxygen complexes resulting from oxygen chemisorption on carbon during oxygen pre-treatment. It is believed that the surface acidity is sufficient to increase ammonia-sorption capacity, but not strong enough to significantly impair ammonia desorption in the vacuum-regeneration step. The initial drop in ammonia-sorption capacity represented by the difference between line 1 and all the other lines in FIG. 6 is believed to be attributable to the presence of a small proportion (about one third) of strongly acidic sites, which tend to adsorb ammonia irreversibly. In the case of Ammonasorb II, which is a carbon impregnated with phosphoric acid, the carbon surface is composed of predominantly strong acidic sites, which, it is believed, is why only about 12% of adsorbed ammonia can be vacuum-regenerated (see FIG. 7).

The Effect of Gas Humidity

Figure 10:
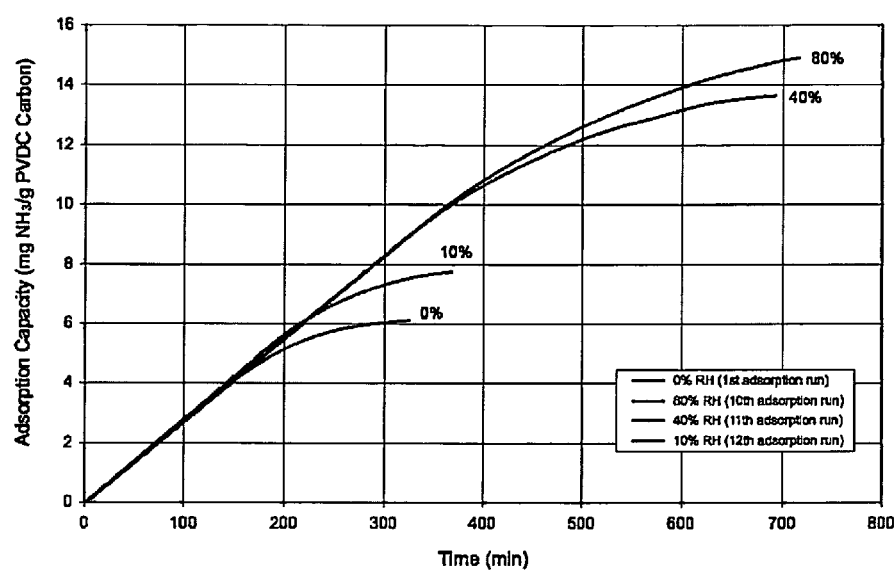
FIG. 10 consists of curves illustrating the effect of gas relative humidity (RH) on ammonia-sorption performance for carbon monolith 07-26-11-de of Table 1.

Like most of the data published in the literature, initial experiments performed pursuant to the present invention involved ammonia sorption from a flow of dry gas. It was believed that the effect of gas humidity was only modest for activated carbons (~0%-136% improvement for 40% relative humidity), as reported by Luna et al., 2010, supra. When experiments with humid gas were performed, it was unexpectedly found that the performance of the present sorbents was improved by a factor of about 2.5 when inlet gas contained water vapor in addition to ammonia, oxygen, and nitrogen. These results are summarized in FIG. 10.

The Effect of Carbon Activation

Figure 11:
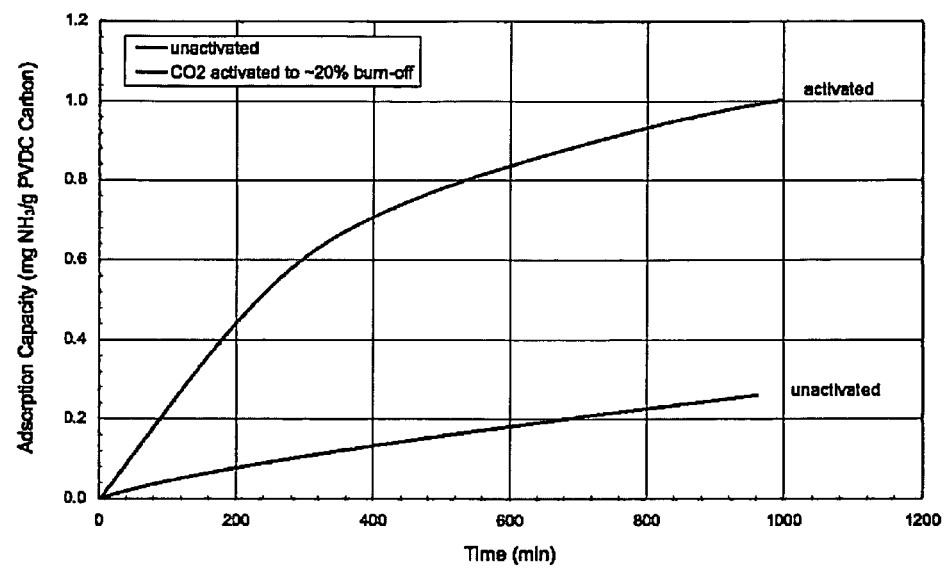
FIG. 11 consists of curves illustrating the effect of carbon activation on ammonia-sorption capacity (a PVDC-derived carbon monolith with 121 parallel channels; adsorption from a dry-gas stream; no surface oxidation other than from prior exposure to ambient air during storage).

Since carbon-activation causes profound changes in the carbon pore structure (pore-size distribution, specific surface area, pore volume, etc.), it is not surprising that these changes should be reflected in ammonia-sorption performance data. An example of sorption-capacity curves for a carbon monolith derived from PVDC is shown in FIG. 11. A strong effect of carbon activation is evident in this case, but the magnitude of sorption enhancement (or reduction) depends on the nature of the carbon, its precursor, carbonization conditions, activation agent (carbon dioxide, steam, oxygen), and activation conditions (temperature and hold time).

The Effect of Carbon Precursor

Three types of PVDC were used in producing sorbents embodying the present invention, obtained from different suppliers, i.e. Dow, Solvay, and Honeywell. The first two are commercial products that include some co-polymers and additives, whereas the Honeywell PVDC was a high-purity research grade homopolymer. Carbons prepared from the above precursors showed different performance characteristics, and monoliths from some of them were easier to fabricate than from others. In general, the Honeywell PVDC carbon showed better sorption capacity than Dow carbon, which in turn was better than Solvay.

Comparison with Off-the-Shelf Granular Activated Carbons and Zeolites

Side-by-side comparisons were conducted with three commercial carbons: Calgon Ammonasorb II (impregnated with phosphoric acid), Calgon BPL (no acid impregnation or acid washing), and Norit DARCO (acid-washed). The comparison of monolithic carbon of the present invention with the state-of-the-art Ammonasorb II is shown in FIG. 6 and FIG. 7, and the monolithic carbon is clearly seen to excel because of its regenerability and good sorption capacity. It should be noted that the Ammonasorb II sorption capacity shown in Table 1 (19.6 mg/g) is in good agreement with the results published by Luna et al. 2010, supra, for the same sorbent and similar sorption conditions (17.8 mg/g and 19.4 mg/g obtained in two separate experiments). The ammonia-sorption capacity of oxidized monolithic carbons that were prepared using the dry technique, and whose carbonization temperature was not higher than 900° C., was found to be a factor of 4-45 higher than the sorption capacity of Calgon BPL (see Table 1). The corresponding factor for the above carbons with respect to Norit DARCO was 0.72-7.5.

The comparison of sorption capacity of PVDC carbons with zeolite-based sorbents looks less favorable at first sight. Under dry-gas conditions, zeolites were found to adsorb between 3.2 mg/g and 47.9 mg/g, and ammonia adsorption from a stream of humid air was somewhat lower: 0.5-38.8 mg/g (Luna et al., 2010). Another study showed, however, that regeneration of zeolites involves heating to elevated temperatures that are well in excess of 100° C., and that the effectiveness of vacuum regeneration is limited (Liu, C. Y. and Aika, K., "Ammonia adsorption on ion exchanged Y-zeolites as ammonia storage material," *J. of the Japan Petroleum Inst.* 46 (5), 301-307, 2003). Thus, it can be concluded that vacuum-regenerable carbon remains attractive for PLSS applications.

Pressure Drop

Figure 12:
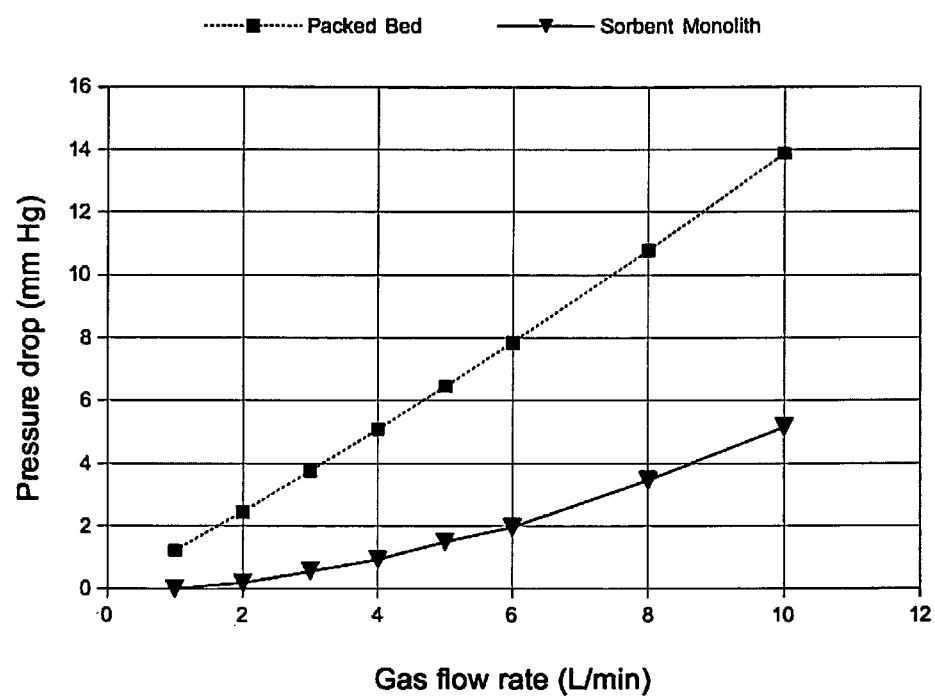
FIG. 12 consists of curves illustrating the comparison of pressure drop over a carbon monolith with the corresponding packed bed of granular sorbent. The measurements were performed on a 22 mm ID foam-based monolith, which was 6 cm in height. The weight of carbon was 4.62 g. For the packed bed, the pressure drop was calculated using the Ergun equation (Ergun, S., *Chem. Eng. Progr.* 48, 89-94, 1952), assuming the same bed diameter and sorbent weight, a height of 2.1 cm, a bed voidage of 40%, and a particle size of 0.3 mm.

Pressure-drop measurements were performed for some of the foam-based monoliths of the invention, and FIG. 12 shows the comparison of the data obtained with the calculated pressure drop for a corresponding packed bed of granular sorbent. The advantage of the monolith over a packed bed seems to be at least a factor of two, and a difference of about two orders of magnitude was found for monoliths with parallel channels (Wójtowicz, M. A., Florczak, E., Kroo, E., Rubenstein, E. P., Serio, M. A., and Filburn, T., "Monolithic sorbents for carbon dioxide removal," *Proc. 36th Int. Conf on Environmental Systems (ICES)*, Norfolk, Va., Jul. 17-20, 2006, SAE technical paper No. 2006-01-2193, SAE International, 2006).

Resistive Heating

It has been shown experimentally that resistive heating to about 80° C. is rapid and effective in the case of carbon-sorbent monoliths. This was done by connecting electrodes to opposite ends of a Duocel vitreous carbon foam, and applying AC voltage. The temperature of the carbon foam was monitored using a hand-held pyrometer. It was demonstrated that the temperature could easily reach about 80° C. within less than 30 seconds. It is reasonable to expect that more effective regeneration will occur when the sorbent is heated in addition to being exposed to vacuum.

Having thus described the invention, what is claimed is:

1. A method for the reversible removal of ammonia from a gaseous, ammonia-containing environment, the steps comprising:
    providing a porous, carbonaceous sorbent that is capable of ammonia sorption and desorption;
    causing a volume of gas from a gaseous, ammonia-containing environment to pass through said sorbent, to thereby effect sorption of ammonia from said gas volume; and
    subjecting said sorbent to vacuum force to thereby effect desorption and removal of a substantial portion of the adsorbed ammonia therefrom; said sorbent having been produced by carbonizing a polymer material so as to produce a high-purity carbon material, and exposing said high-purity carbon material to an oxidizing environment under conditions sufficient to produce an effective amount of at least one oxygen species on exposed surfaces of said high-purity carbon material, and said sorbent containing at least about 0.10 weight percent of said at least one oxygen species.

2. The method of claim 1 wherein said effective amount of said at least one oxygen species is at least 0.25 weight percent of said sorbent.

3. The method of claim 1 wherein said at least one oxygen species is produced by exposing said sorbent to an oxidizing environment selected from the group consisting of air, oxygen, ozone, hydrogen peroxide, nitric acid, and mixtures thereof.

4. The method of claim 3 wherein said oxidizing environment comprises air at a temperature in the range 150 to 400° C., and wherein the time of exposure is at least 5 minutes.

5. The method of claim 4 wherein said temperature range is 250 to 325° C., and said time is 24 to 72 hours.

6. The method of claim 1 wherein said carbonaceous sorbent consists essentially of high-purity carbon, effectively free from mineral contaminants in elemental or molecular state.

7. The method of claim 1 wherein said polymer material is selected from the group consisting of polyvinylidene chloride homopolymer or copolymer, polyfurfuryl alcohol, phenolic resin, and mixtures thereof.

8. The method of claim 7 wherein said polymer comprises at least 70 weight percent of polyvinylidene chloride.

9. The method of claim 1 wherein the pores of said sorbent do not substially exceed 20 angstroms in size.

10. The method of claim 1 wherein said sorbent is produced by with the additional steps of: providing a support having an open-cell, three-dimensional, lattice-like structure with large-scale porosity of not more than 500 pores per linear inch; providing a liquid polymer solution or a polymer material in powder form; infusing said support with either said polymer solution or said polymer material powder; and heat-treating said infused support so as to carbonize the polymer of said solution or of said polymer material powder so to produce therefrom said high-purity carbon material.

11. The method of claim 10 wherein the porosity of said support is in the range of 5 to 300 pores per inch.

12. The method of claim 11 wherein the porosity of said support does not exceed 100 pores per inch.

13. The method of claim 10 wherein said support is a material selected from the class consisting of reticulated vitreous carbon foam, reticulated metal, and reticulated silicon carbide.

14. The method of claim 13 wherein said support material is reticulated vitreous carbon foam.

15. The method of claim 1 wherein said sorbent is subjected to said vacuum force, to effect desorption, at ambient temperature.

16. A method for the production of a sorbent for removing at least one gas from a gaseous environment in which the gas is contained, comprising the steps:
    carbonizing a polymer material so as to produce a high-purity carbon material; and
    exposing said high-purity carbon material to an oxidizing environment under conditions sufficient to produce an effective amount of at least one oxygen species on exposed surfaces of said high-purity carbon material.

17. The method of claim 16 wherein said oxidizing environment is selected from the group consisting of air, oxygen, ozone, hydrogen peroxide, nitric acid, and mixtures thereof, and wherein said effective amount of said at least one oxygen species is at least 0.10 weight percent of said sorbent.

18. The method of claim 17 wherein said oxidizing environment comprises air at a temperature in the range of 150° C. to 400° C., and wherein the time of exposure is at least 5 minutes.

19. The method of claim 18 wherein said temperature range is 250° C. to 325° C., and said time is 24 to 72 hours.

20. The method of claim 16 wherein said polymer material is selected from the group consisting of polyvinylidene chloride homopolymer or copolymer, polyfurfuryl alcohol, phenolic resin, and mixtures thereof.

21. The method of claim 20 wherein said polymer comprises at least 70 weight percent of polyvinylidene chloride.

22. The method of claim 16 wherein the pores of said sorbent are 20 angstroms or less in size.

23. A method for the production of a sorbent for removing at least one gas from a gaseous environment in which the gas is contained, comprising the steps:
  providing a support having an open-cell, three-dimensional, lattice-like structure with large-scale porosity, wherein there are not more than 500 pores per linear inch;
  providing a liquid polymer solution or a polymer material in powder form;
  infusing said support with either said polymer solution or said polymer material powder; and
  heat-treating said infused support so as to carbonize the polymer of said solution or of said polymer material powder so to produce a high-purity carbon material therefrom.

24. The method of claim 23 wherein a liquid polymer solution is provided, and wherein said method includes at least one cycle of dipping said support into said liquid polymer solution to effect said infusion, followed by draining and drying of said support prior to said heat-treating step.

25. The method of claim 24 including at least a second said cycle.

26. The method of claim 24 wherein said liquid polymer solution is prepared by dissolving a polymer material selected from the group consisting of polymers comprising polyvinylidene chloride homopolymer or copolymer, polyfurfuryl alcohol, phenolic resin, and mixtures thereof, desolved in a solvent selected from the class consisting of acetone, methyl ethyl ketone, N-methylpyrrolidone, and mixtures thereof.

27. The method of claim 26, wherein said polymer material comprises at least 70 weigh percent of polyvinylidene chloride.

28. The method of claim 23 including an additional step of curing of said infused support in water at a temperature of in the range 30° C. to 100° C.

29. The method of claim 23 wherein said heat-treating of said infused support is effected in an inert atmosphere or vacuum and at a temperature in the range of 300° C. to 1,500° C.

30. The method of claim 23 wherein the pores of said sorbent do not substantially exceed 20 angstroms in size, and wherein said large-scale porosity is 5 to 300 pores per inch.

31. The method of claim 30 wherein said large-scale porosity is not in excess of 100 pores per inch.

32. The method of claim 23 wherein the exposed surfaces of said sorbent carry thereon an effective amount of at least one oxygen species.

33. A sorbent produced by the method of claim 16.

34. A sorbent produced by the method of claim 23.

* * * * *